United States Patent
Howard et al.

(10) Patent No.: US 8,621,072 B2
(45) Date of Patent: Dec. 31, 2013

(54) PROVIDING NOTIFICATION OF DOCUMENT REPOSITORY EVENTS TO EXTERNAL SYSTEMS

(75) Inventors: Robert McKee Howard, Seattle, WA (US); Joseph C. Chang, Redmond, WA (US); Shaofeng Zhu, Bellevue, WA (US); Naganandhini Kohareswaran, Kirkland, WA (US); Eray Aydin, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 55 days.

(21) Appl. No.: 13/311,550

(22) Filed: Dec. 6, 2011

(65) Prior Publication Data
US 2013/0145014 A1    Jun. 6, 2013

(51) Int. Cl.
*G06F 15/173* (2006.01)

(52) U.S. Cl.
USPC .......... 709/224; 709/204; 707/740; 707/737; 719/318; 719/332; 719/315; 719/331; 717/104; 717/105; 717/108; 717/110; 717/124; 455/514; 455/519; 455/518

(58) Field of Classification Search
USPC ................................ 709/224, 217, 201, 203
See application file for complete search history.

(56) References Cited

U.S. PATENT DOCUMENTS

| | | | |
|---|---|---|---|
| 7,269,618 B2 * | 9/2007 | Nakajima | 709/201 |
| 7,650,609 B2 | 1/2010 | Klevenz et al. | |
| 7,831,655 B2 | 11/2010 | Upton | |
| 8,027,349 B2 * | 9/2011 | Brown et al. | 370/399 |
| 8,082,224 B2 * | 12/2011 | Marinescu | 707/617 |
| 8,259,152 B2 * | 9/2012 | Eriksson et al. | 348/14.01 |
| 8,428,561 B1 * | 4/2013 | Vance et al. | 455/412.2 |
| 8,464,281 B2 * | 6/2013 | Mebane, III | 719/318 |
| 2002/0165998 A1 | 11/2002 | Hrebejk et al. | |
| 2002/0188675 A1* | 12/2002 | Nakajima | 709/203 |
| 2005/0132104 A1* | 6/2005 | Brown | 710/36 |

(Continued)

FOREIGN PATENT DOCUMENTS

KR    10-2006-0094857    8/2006

OTHER PUBLICATIONS

Swanson, et al., "Integrating External Document Repositories with SharePoint Server 2007", Retrieved at <<http://msdn.microsoft.com/en-us/library/dd440954(v=office.12).aspx>>, Feb. 2009, pp. 13.

(Continued)

*Primary Examiner* — Jude Jean Gilles
(74) *Attorney, Agent, or Firm* — Hope Baldauff, LLC (57) ABSTRACT

Remote event receivers can register with a document repository computing system to receive notifications of events occurring at a document repository. The remote event receivers may register to receive notifications synchronously, whereby the remote event receivers can provide a response to the notification prior to the occurrence of the event, or asynchronously, whereby the remote event receivers provide no response. Synchronous remote event receivers can also specify in a response to the notification that the event should be canceled or may specify properties that should be changed. Remote event receivers can be pre-event receivers that receive notifications prior to the occurrence of an event, or post-event receivers that receive notifications following the event. When an event is to occur at the document repository, notifications are provided to the pre-event remote event receivers. Once the event has occurred, notifications are provided to the post-event remote event receivers.

20 Claims, 8 Drawing Sheets

(56) References Cited

U.S. PATENT DOCUMENTS

| | | |
|---|---|---|
| 2006/0195777 A1 | 8/2006 | Davis et al. |
| 2007/0022194 A1* | 1/2007 | Brown et al. ................. 709/224 |
| 2007/0038610 A1* | 2/2007 | Omoigui ........................... 707/3 |
| 2008/0085502 A1 | 4/2008 | Allen et al. |
| 2009/0284779 A1* | 11/2009 | Isshiki ........................ 358/1.13 |
| 2010/0094839 A1 | 4/2010 | Brach |
| 2010/0185747 A1 | 7/2010 | Ruhlen et al. |
| 2011/0047127 A1 | 2/2011 | Scott et al. |
| 2011/0179427 A1 | 7/2011 | Krishnamoorthy et al. |
| 2011/0239228 A1 | 9/2011 | Grigsby et al. |
| 2012/0047519 A1* | 2/2012 | Mebane, III ................... 719/318 |
| 2012/0191716 A1* | 7/2012 | Omoigui ....................... 707/740 |

OTHER PUBLICATIONS

Laplante, Mary, "Content Repository Synchronization", Retrieved at <<http://www.entropysoft.net/files/content/shared/files/Analysts/OSG-Spotlight-Synch-final-21Mar.pdf>>, Mar. 2011, pp. 1-4.

International Search Report dated Feb. 22, 2103 in International Application No. PCT/US12/066562, 10 pages.

* cited by examiner

PROVIDING NOTIFICATION OF DOCUMENT REPOSITORY EVENTS TO EXTERNAL SYSTEMS

BACKGROUND

Document repositories are often important hubs for productivity and collaboration within an organization. As a result, there is commonly a need to integrate other external systems, such as line of business ("LOB") systems, with the resources stored in document repositories.

Some solutions allow organizations to incorporate data from external systems into their document repositories, allowing them to more easily incorporate data stored at the external systems into the repositories. Other solutions expose world wide web ("web" or "Web") services that allow external systems to retrieve information from a document repository for use within the external system. Neither of these capabilities, however, makes it possible for external systems to be informed directly of events occurring within a document repository, such as changes made to documents or lists. This makes it difficult to incorporate data or documents held in a document repository in business processes managed by an external system.

Some document repository systems support functionality for permitting custom third-party code to be executed in response to the occurrence of a specified event. This functionality is typically enabled by allowing a document repository administrator to deploy the custom code to the actual servers running the document repository. Doing so, however, can be difficult or prohibitively expensive to manage in many cases. Moreover, in hosted and/or multi-tenant document repositories, this approach may be even more challenging because the custom code must be prevented from performing expensive or damaging operations to the hosted system, or from accessing data of other tenants of a multi-tenanted document repository.

One approach to address these problems is to run the custom code in a "sandbox" that restricts the custom code to a safe, isolated execution environment. In many cases, however, such a restriction not only prevents the code from performing expensive or malicious operations, but also prevents the code from performing some operations that may be necessary to achieve the desired goals of the custom code. As a result, it can be difficult or impossible to implement the custom code in a way that allows it to effectively execute within such a sandbox. It is with respect to these and other considerations that the disclosure made herein is presented.

SUMMARY

Concepts and technologies are described herein for providing notification of events occurring within a document repository system to other external systems. Through an implementation of the technologies disclosed herein, notifications of events occurring within a document repository can be provided to external systems without deploying custom third-party code to the servers running the document repository and without executing the custom code in a sandbox.

According to one aspect presented herein, a document repository computing system is provided that includes functionality for providing notification of events to remote event receivers. The remote event receivers are executed on computer systems external to the document repository computing system, such as computer systems owned, operated, or managed by third parties.

In order to receive notifications of events, the remote event receivers register with the document repository computing system. The remote event receivers may be registered declaratively, such as through the use of an extensible markup language ("XML") document that specifies details regarding each remote event receiver and the type of notifications they would like to register for, or programmatically through an object model exposed by the document repository computing system. Other mechanisms might also be used to register remote event receivers for notifications.

The remote event receivers may register to receive notifications related to events occurring with regard to the content of a document repository and/or the structure of the document repository. For instance, remote event receivers may register for notifications of the following, without limitation: the creation, updating, and deletion of documents in a document repository; the checking out, checking in, canceling a check out of an item or document in the repository; attaching a file or removing an attachment from an item in the repository; moving an item or document in the repository; adding, updating, or removing metadata fields in the document repository; adding or removing lists and libraries in the document repository; and adding or removing larger containers, such as web sites and site collections, within the document repository. The remote event receivers might also register to receive notifications of other types of events occurring with regard to the contents, structure, or operation of a document repository.

According to various embodiments, the remote event receivers may register to receive notifications synchronously or asynchronously. Remote event receivers that register for synchronous notification may be referred to herein as "synchronous remote event receivers." Remote event receivers that register for asynchronous notification may be referred to herein as "asynchronous remote event receivers." The document repository computing system will send notifications to synchronous remote event receivers and then wait for a response before providing a notification to the next remote event receiver. In this way, synchronous remote event receivers are effectively called in series. The document repository computing system does not wait for a response from asynchronous remote event receivers. In this way, asynchronous remote event receivers may be called in parallel.

Remote event receivers may also register to receive a notification regarding an event prior to the occurrence of the event or following the occurrence of the event. Remote event receivers that register for notification of an event prior to the occurrence of the event may be referred to herein as "pre-event remote event receivers." Remote event receivers that register for notification following the occurrence of an event may be referred to herein as "post-event remote event receivers."

In one embodiment, each remote event receiver also has an associated sequence number. The sequence number indicates the order in which remote event receivers that are registered for the same event should receive notification of the event. Local event receivers executing on the document repository computing system might also have associated sequence numbers and be called in sequence order with the remote event receivers.

When the document repository computing system determines that an event is to occur, the document repository computing system determines if any pre-event remote event receivers have been registered to receive notification of the event. If so, the document repository computing system generates calls to the pre-event remote event receivers. The calls include data formatted according to a pre-defined schema and provide notification that the event is to occur. The calls might also include properties associated with the event, such as "before" properties that define aspects of an item in a document repository prior to the event, and/or "after" properties that include properties that define aspects of the item after the event has completed. The calls may be implemented as web service calls or in another manner.

If any of the pre-event remote event receivers have registered for synchronous notification, the document repository computing system waits for a response, such as a web service response, from the remote event receivers before calling the next remote event receiver. In the response, the synchronous pre-event remote event receivers may indicate that the event should be canceled, in which case the event is canceled and no additional notifications are provided, or may modify the after properties associated with the event. If a synchronous pre-event remote event receiver does not provide a response, the document repository computing system might cancel or continue with the event according to embodiments. Once all of the pre-event remote event receivers have been notified of the event, the after properties associated with the event are persisted and the event is completed.

Once the event has completed, the document repository computing system determines whether any post-event remote event receivers have been registered. If so, the document repository computing system generates calls to the post-event remote event receivers in sequence number order. Synchronous post-event remote event receivers are not permitted to cancel the event, nor are they permitted to modify the after properties associated with the event since the event has already occurred and the after properties have already been committed.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to concepts and technologies for providing notification of events occurring within a document repository to external systems. As discussed briefly above, using the technologies disclosed herein, notifications of events occurring within a document repository system can be provided to external systems without requiring that third-party code be executed on the document repository system. Additional details regarding these and other features will be provided below with regard to FIGS. 1-7.

While the subject matter described herein is presented in the general context of program modules that execute in conjunction with the execution of an operating system and various programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for providing notification of events occurring within a document repository system to external systems will be described.

Figure 1:
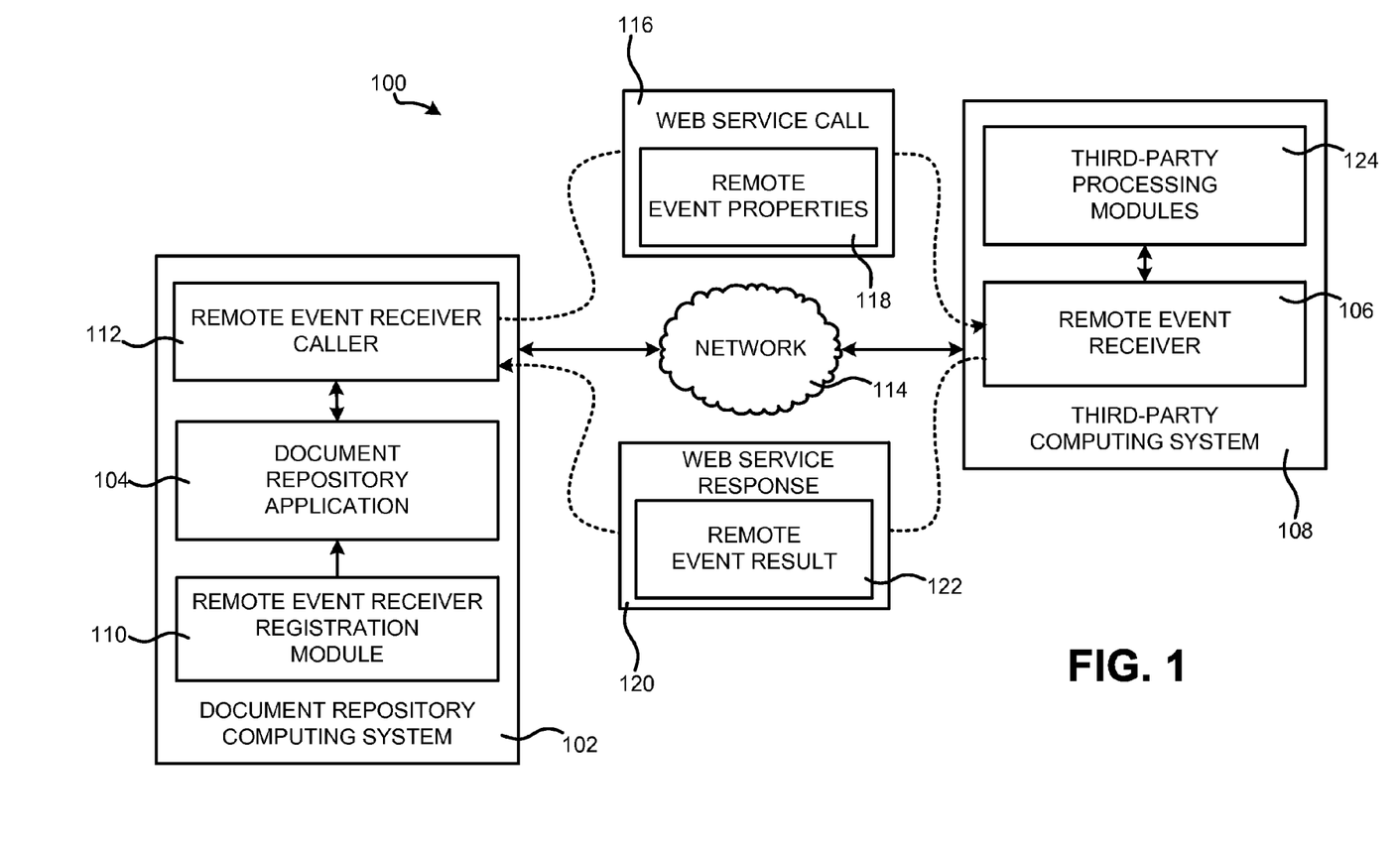
FIG. 1 is a network diagram showing aspects of a document repository computing system and a third-party computing system utilized in the various embodiments disclosed herein.

FIG. 1 is a network diagram showing aspects of a document repository computing system 102 and a third-party computing system 108 utilized in the various embodiments disclosed herein. In particular, FIG. 1 shows an environment 100 that includes a document repository computing system 102. The document repository computing system 102 is one or more computing systems configured to execute a document repository application 104. The document repository application 104 provides functionality for creating and utilizing document repositories. As known in the art, document repositories provide functionality for storing, accessing, and sharing documents and potentially other types of items among users of the document repository computing system 102. In this regard, the document repository application 104 may provide functionality for allowing a user of the document repository computing system 102 to create, update, and delete documents and other types of items in a document repository.

Users may also be permitted to check out, check-in, or cancel a check out of an item or document from a document repository provided by the document repository application 104. Users may also be permitted to attach a file or remove attachments from items in the document repository, move an item or document in a document repository, and add, update, or remove metadata fields in a document repository. Users may also add or remove lists and libraries in the document repository and add or remove larger containers such as websites provided by the document repository application 104 and collections of sites.

As will be described in greater detail herein, the document repository application 104 is configured to provide notifications of the various types of events described just above. The document repository application 104 may also provide notifications of other types of events occurring at the document repository computing system 102 with respect to a document repository provided by the document repository application 104.

According to various embodiments, the document repository application 104 is configured to provide notifications of events to remote event receivers 106. Remote event receivers 106 are software components executing on computing systems that are external to the document repository computing system 102, such as the third-party computing system 108. The third-party computing system 108 may be owned, operated, or controlled by an entity other than the entity that operates the document repository computing system 102.

In order to provide the notifications as described herein, the document repository computing system 102 may be connected to the third-party computing system 108 by one or more networks 114. The networks may be local area networks, wide area networks, or other types of networks that enable data communication between the document repository computing system 102 and the third-party computing system 108. It should be appreciated that although FIG. 1 illustrates only a single network 114, many such networks may be utilized to create an appropriate data communications connection between the document repository computing system 102 and the third-party computing system 108.

In order to receive notifications of events occurring at the document repository computing system 102, each remote event receiver 106 must register with the document repository application 104. In one embodiment, a remote event receiver registration module 110 is executed in order to register a remote event receiver 106 with the document repository application 104. According to various embodiments, the remote event receiver 106 may be registered declaratively such as through the use of an XML document that specifies details regarding the remote event receiver 106 and the type of notifications that it would like to register for. In other embodiments, the remote event receiver registration module 110 registers the remote event receiver 106 programmatically through an object model exposed by the document repository application 104.

According to various embodiments, the remote event receiver 106 may register to receive notifications relating to events occurring with regard to the content of a document repository and/or the structure of a document repository provided by the document repository computing system 102. As discussed above, the remote event receiver 106 may register for notifications of the following, without limitation: the creation, updating, and deletion of documents in a document repository; the checking out, checking in, canceling a check out of an item or document in the repository; attaching a file or removing an attachment from an item in the repository; moving an item or document in the repository; adding, updating, or removing metadata fields in the document repository; adding or removing lists and libraries in the document repository; and adding or removing larger containers, such as web sites and site collections, within the document repository. The remote event receivers 106 might also register to receive notifications of other types of events occurring with regard to the contents, structure, or operation of a document repository.

As also described briefly above, the remote event receiver 106 may register to receive notifications synchronously or asynchronously. As will be described in greater detail below, the remote event receiver caller 112 executing within the document repository computing system 102 will send notifications to synchronous remote event receivers 106 and then wait for a response before providing a notification to another remote event receiver. If the remote event receiver 106 registers for asynchronous notification, the remote event receiver caller 112 will not wait for a response from the remote event receiver 106 before calling another remote event receiver.

Remote event receivers 106 may also register to receive notifications prior to the occurrence of an event or following the occurrence of the event. Synchronous pre-event remote event receivers may also be permitted to cancel the occurrence of an event or to change properties associated with the event. Additional details regarding this functionality will be provided below.

A sequence number is also specified when a remote event receiver 106 registers with the document repository computing system 102. As discussed briefly above, the sequence number indicates the order in which remote event receivers 106 that are registered for notifications for the same event should receive notification. Although not illustrated in FIG. 1, local event receivers may be executed on the document repository computing system 102. The local event receivers may also include sequence numbers that are utilized to execute the local event receivers in sequence with the remote event receivers 106. Additional details regarding the registration of the remote event receivers 106 with the document repository computing system 102 will be provided below with respect to FIG. 2.

Once a remote event receiver 106 has registered with the document repository computing system 102 for notification of events, the remote event receiver 106 is eligible to begin receiving notifications. When the document repository system 102 determines that an event is about to occur, the document repository computing system 102 determines if any pre-event remote event receivers 106 have been registered to receive notification of the event. If so, the remote event receiver caller 112 generates a call to the registered pre-event remote event receivers 106. In one embodiment, the call is a Web service call 116 to the remote event receiver 106 that includes remote event properties 118. The remote event properties 118 define various properties associated with the event, such as before properties that define aspects of an item or document in the document repository prior to the event, and/or after properties that include properties that define aspects of the item or document after the event has completed. Additional details regarding the remote event properties 118 will be provided below with regard to FIG. 3.

In one embodiment, the Web service call 116 is implemented utilizing the simple object access protocol ("SOAP"). It should be appreciated, however, that other types of Web service calls might be utilized. It should also be appreciated that other types of network messages and protocols might be utilized to provide the remote event properties 118 to a remote event receiver 106 in other embodiments.

If the remote event receiver 106 has registered for synchronous notification, the remote event receiver caller 112 will wait for a Web service response 120 from the remote event receiver 106. While the remote event receiver caller 112 is awaiting the Web service response 120, no additional remote event receivers 106 will be called.

As illustrated in FIG. 1, the Web service response 120 includes a remote event result 122. The remote event result 122 is data formatted according to a pre-defined schema that indicates to the document repository computing system 102 whether the event should be permitted to continue or should be cancelled. Additionally, the remote event result 122 might indicate properties associated with the event that should be modified. For instance, the remote event result 122 may specify changed after properties for the event that should be persisted by the document repository computing system 102.

If a synchronous pre-event remote event receiver 106 does not provide a response 120, the document repository computing system 102 may elect to cancel or continue with the event according to various embodiments disclosed herein. Additional details regarding the remote event result 122 will be provided below with regard to FIG. 4.

Once all the registered pre-event remote event receivers 106 have been called, the after properties associated with the event, including any properties modified by a synchronous remote event receiver 106, are persisted and the event is permitted to complete. Once the event has completed, the document repository computing system 102 determines whether any post-event remote event receivers have been registered. If so, the remote event receiver caller 112 generates calls to the post-event remote event receivers 106 in sequence number order. As mentioned briefly above, synchronous post-event remote event receivers are not permitted to cancel an event nor are they permitted to modify the after properties associated with the event since the event has already completed. Additional details regarding the processes described above with regard to FIG. 1 will be provided below with regard to FIGS. 2-6.

Figure 2:
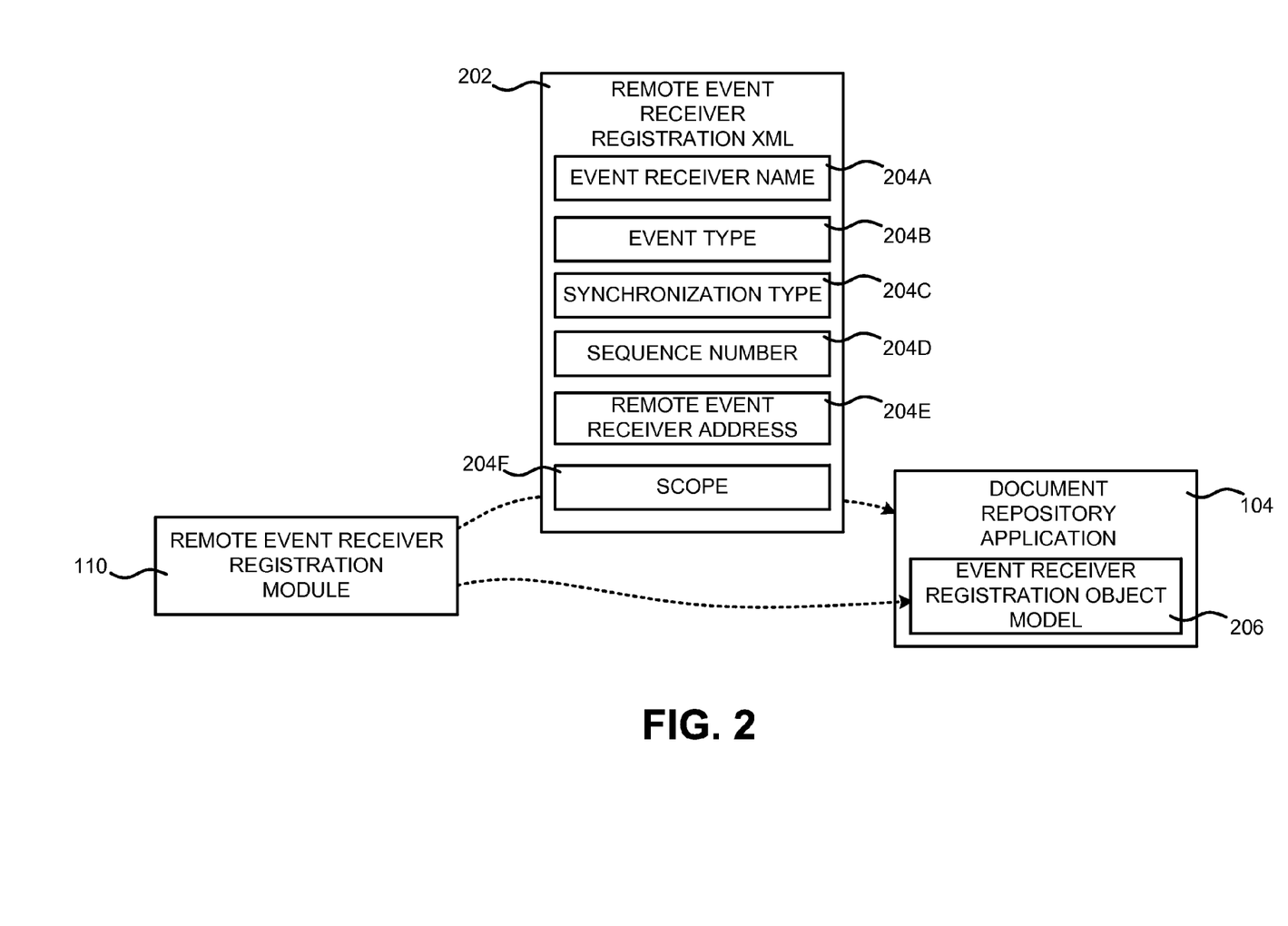
FIG. 2 is a data structure diagram showing aspects of several mechanisms disclosed herein through which a remote event receiver executing on a third-party computing system can register to receive notification of events occurring within a document repository system.

FIG. 2 is a data structure diagram showing aspects of several mechanisms disclosed herein through which a remote event receiver 106 executing on a third-party computing system 108 can register to receive notification of events occurring within a document repository computing system 102. For instance, according to various embodiments disclosed herein, the document repository computing system 102 may provide declarative, object model, Web service, and application programming interface-based mechanisms for registering a remote event receiver 106. Several of these mechanisms are illustrated in FIG. 2.

It should be appreciated that, regardless of the mechanism utilized to register a remote event receiver 106, certain information is provided at the time of registration. For instance, according to various embodiments, information is provided regarding the events that each remote event receiver 106 would like to be notified about, a network address of the remote event receiver 106 that is to be called when the event occurs, the scope of the registration, such as the identity of specific object instances or scopes within a document repository for which the remote event receiver 106 would like to receive events, an indication as to whether the notifications should be provided synchronously or asynchronously, and a sequence number that indicates the priority with which the remote event receiver 106 would like to receive the event when multiple receivers are registered for the same event.

According to one embodiment, the information described above is provided in a remote event receiver registration XML file 202 that can be declaratively defined and provided to the document repository application 104. In other embodiments, this information is provided by the remote event receiver registration module 110 through an event receiver registration object model 206 provided by the document repository application 104. Other mechanisms may also be utilized to provide the above-described information to the document repository application 104 in order to register a remote event receiver 106 for notifications.

The remote event receiver registration XML 202 shown in FIG. 2 that is used to declaratively register a remote event receiver 106 in one embodiment includes a number of elements 204A-240F. The element 204A is utilized to specify a name of the remote event receiver 106 being registered. The element 204B is utilized to specify a type of event that the remote event receiver 106 is being registered for. As discussed briefly above, the event type element 204B may be utilized to register for notification prior to the occurrence of an event or to register for notification following the occurrence of the event.

For instance, a value for the event type element 204B of "item updating" registers the remote event receiver 106 to receive notifications just prior to the updating of an item in a document repository. Similarly, a value of "item updated" registers the remote event receiver 106 to receive a notification after an item has been updated in the document repository. Similar values may be specified for the event type element 204B to register the remote event receiver 106 for notifications prior to or following the adding, updating, deleting, checking-in, checking-out, unchecking-out of items in a document repository. Values may also be specified for the event type element 204B to receive notifications before or after attachments are added or deleted to items and/or when files in a document repository are moved.

Values may also be specified for the event type element 204B to receive notifications before or after list event are added, updated, or deleted, or before or after lists are added or deleted. Values may also be specified for the event type element 204B to receive notifications before or after a site or a Web is deleted, moved, or added. It should be appreciated that the value for the event type element 204B described above are merely illustrative and that other values may be specified for the event type element 204B to receive notifications of other types of events.

As discussed above, remote event receivers 106 may register for synchronous or asynchronous notification of events occurring within the document repository computing system 102. The synchronization type element 204C is utilized to specify whether a remote event receiver 106 should be notified synchronously or asynchronously. As also described above, remote event receivers 106 may be called in sequence number order. The sequence number for a particular remote event receiver 106 may be specified in the sequence number element 204D.

The remote event receiver address element 204E is utilized to specify a network address of the remote event receiver 106 that is to be called when the event specified by the event type element 204B occurs. The network address may be specified using a uniform resource locator ("URL"), an actual network address, or in another manner.

The scope element 204F is utilized to specify the scope of the registration for which notifications are to be provided. For instance, in one embodiment, the scope element 204F is utilized to specify specific object instances or scopes within a document repository for which the remote event receiver 106 would like to receive a notification.

It should be appreciated that the contents of the remote event receiver registration XML 202 described above are merely illustrative and that other data might be provided to the document repository application 104 during the registration of a remote event receiver 106. It should also be appreciated that other mechanisms than those described herein might also be utilized to register a remote event receiver 106 with a document repository application 104.

Figure 3:
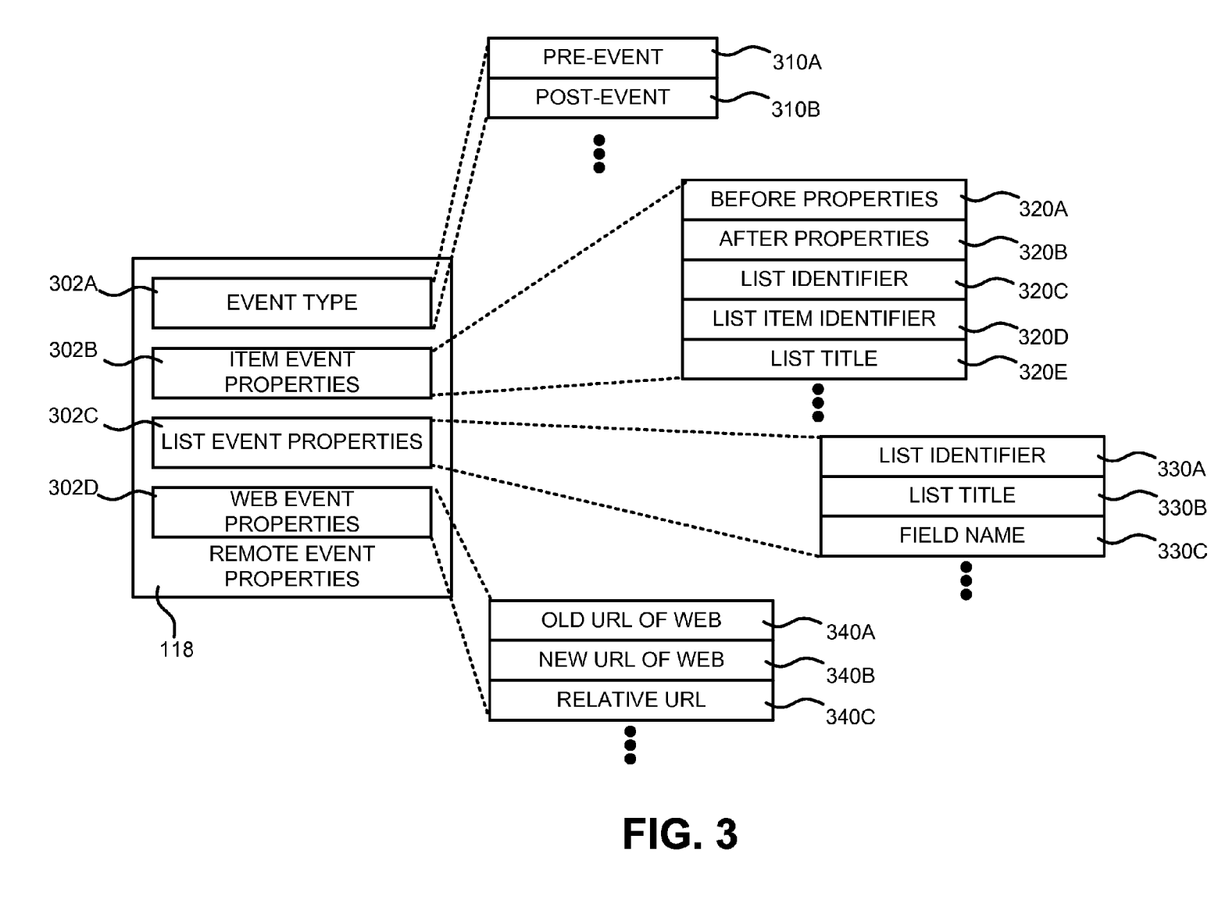
FIG. 3 is a data structure diagram showing the configuration of a remote event properties data structure utilized in embodiments disclosed herein.

FIG. 3 is a data structure diagram showing the configuration of a remote event properties data structure 118 utilized in embodiments disclosed herein. As described briefly above with regard to FIG. 1, the document repository computing system 102 is configured to notify a remote event receiver 106 of the occurrence of an event by making a Web service call 116 to the remote event receiver 106. As also discussed briefly above, the Web service call 116 includes remote event properties 118 in one embodiment disclosed herein. FIG. 3 illustrates one example schema for the remote event properties 118 in one embodiment disclosed herein.

As shown in FIG. 3, the remote event properties 118 include an event type element 302A. The remote event properties 118 will also include one of item event properties 302B, list event properties 302C, or Web event properties 302D, depending upon the type of event that has occurred or is about to occur. The item event properties 302B will be provided when the event relates to an item, the list event properties 302C will be provided when the event relates to a list, and the Web event properties 302D will be provided when the event relates to a Web.

The event type element 302A specifies the type of event that has occurred. For instance a value 310A may be provided indicating that a pre-event has occurred or a value 310B may be provided indicating that a post-event has occurred. For instance, values such as those described above with regard to the event type element 204B may be specified in the element 302A.

The item event properties 302B may include before properties 320A and after properties 320B. As discussed briefly above, the before properties 320A define aspects of an item in a document repository prior to the event for which notification has been made. For instance, the before properties 320A may specify properties associated with a document prior to a modification to the document being made.

The after properties 320B define aspects of the item after the event has completed. For example, the after properties 320B may specify what the properties associated with the document will be after the modification to the document has occurred. As will be described in greater detail below, a synchronous pre-event remote event receiver 106 can specify a set of modified after properties 320B and return the properties to the document repository application 104.

The list identifier element 320C identifies the list that the item for which the notification has been generated is a member. The list item identifier element 320D identifies the item for which the notification has been received. The list title element 320E provides a title of the list in which the item for which notification has been generated. One illustrative schema for the item event properties element 302B is provided below with regard to Table 1. It should be appreciated that this schema is merely illustrative and that other data structures may be utilized.

TABLE 1

```
<xs:complexType name="SPRemoteItemEventProperties">
    <xs:sequence>
        <xs:element name="AfterProperties"
        type="ArrayOfKeyValueOfstringanyType"
/>
        <xs:element name="BeforeProperties"
type="ArrayOfKeyValueOfstringanyType" />
        <xs:element name="ListId" type="ser:guid" />
        <xs:element name="ListItemId" type="xs:int" />
        <xs:element name="ListTitle" type="xs:string" />
        <xs:element name="WebUrl" type="xs:string" />
    </xs:sequence>
</xs:complexType>
```

The list event properties element 302C includes a list identifier 330A, a list title 330B, and a field name 330C in one embodiment. The list identifier 330A includes data that identifies the list for which notification has been received. The list title 330B identifies the title of the list for which the notification has been received. The field name 330C identifies the field of the list identified by the list identifier 330A that has been modified. One illustrative schema for the list event properties element 302C is provided below with regard to Table 2.

TABLE 2

```
<xs:complexType name="SPRemoteListEventProperties">
    <xs:sequence>
        <xs:element name="FeatureId" type="ser:guid"/>
        <xs:element name="FieldName" type="xs:string"/>
        <xs:element name="FieldXml" type="xs:string"/>
        <xs:element name="ListId" type="ser:guid"/>
        <xs:element name="ListTitle" type="xs:string"/>
        <xs:element name="TemplateId" type="xs:int"/>
        <xs:element name="WebUrl" type="xs:string"/>
    </xs:sequence>
</xs:complexType>
```

The Web event properties element 302D provides a previous URL of a Web 340A, a new URL of the Web 340B, and a relative URL 340C of the Web. One illustrative schema for the Web event properties 320D is provided below with regard to Table 3.

TABLE 3

```
<xs:complexType name="SPRemoteWebEventProperties">
    <xs:sequence>
        <xs:element name="FullUrl" type="xs:string"/>
        <xs:element name="NewServerRelativeUrl" type="xs:string"/>
        <xs:element name="ServerRelativeUrl" type="xs:string"/>
    </xs:sequence>
</xs:complexType>
```

It should be appreciated that the data structures, elements, and values illustrated in FIG. 3 are merely illustrative. Other data schemas, data structures, and data types may be utilized that include more or fewer elements than described above. In this regard it should be appreciated that other types and configurations of data may be provided to a remote event receiver 106 with a Web service call 116 indicating that an event has occurred at a document repository application 104.

Figure 4:
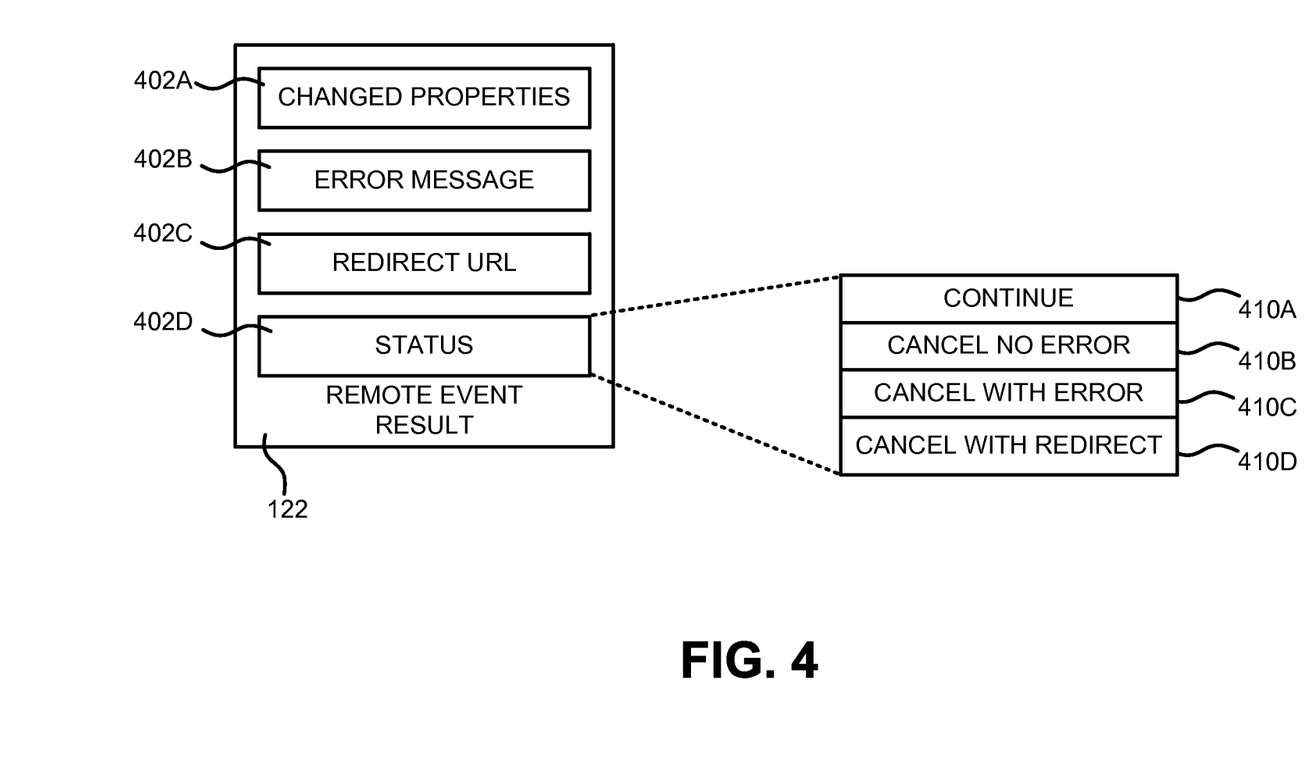
FIG. 4 is a data structure diagram showing the configuration of a remote event result data structure utilized in embodiments disclosed herein.

FIG. 4 is a data structure diagram showing the configuration of a remote event result data structure 122 utilized in embodiments disclosed herein. As described briefly above with regard to FIG. 1, synchronous remote event receivers 106 can transmit a Web service response 120 to the document repository computing system 102 in response to a Web service call 116. According to one implementation, the Web service response 102 includes a remote event result 122. FIG. 4 illustrates one configuration of the remote event result 122 in one embodiment disclosed herein.

As illustrated in FIG. 4, the remote event result 122 may include a changed properties element 402A, an error message 402B, a redirect URL 402C, and a status element 402D. The status element 402D includes one value that indicates to the document repository computing system 102 how to proceed with the event that was the subject of the Web service call 116. In particular, the status element 402D may include a continue value 410A that indicates that the event should be permitted to continue. The status element 402D might include a cancel no error value 410B that cancels the event but provides no error to the user of the document repository computing system 102. Alternately, the status element 402D may include a cancel with error value 410C that cancels the event but also provides an error message to the user. The error message is specified by the error message element 402B. The status element 402D may also include a cancel with redirect value 410D that causes the event to be canceled and redirects the user to a URL specified by the redirect URL 402C.

As discussed briefly above, the remote event result 122 may also include a changed properties element 402A. The changed properties element 402A is utilized to specify one or more properties changed by the remote event receiver 106.

For instance, the remote event receiver 106 may modify one or more of the after properties 320B specified in the item event properties element 302B described above. As will be described in greater detail below, when the document repository computing system 102 receives a remote event result 122 that includes a populated changed properties element 402A, the document repository computing system 102 modifies the after properties 320B with the changed values prior to calling the next remote event receiver 106 or performing the event if no additional remote event receivers 106 remain to be called. Additional details regarding the use of the changed properties element 402A will be provided below with regard to FIGS. 5A-5B.

Figure 5A:
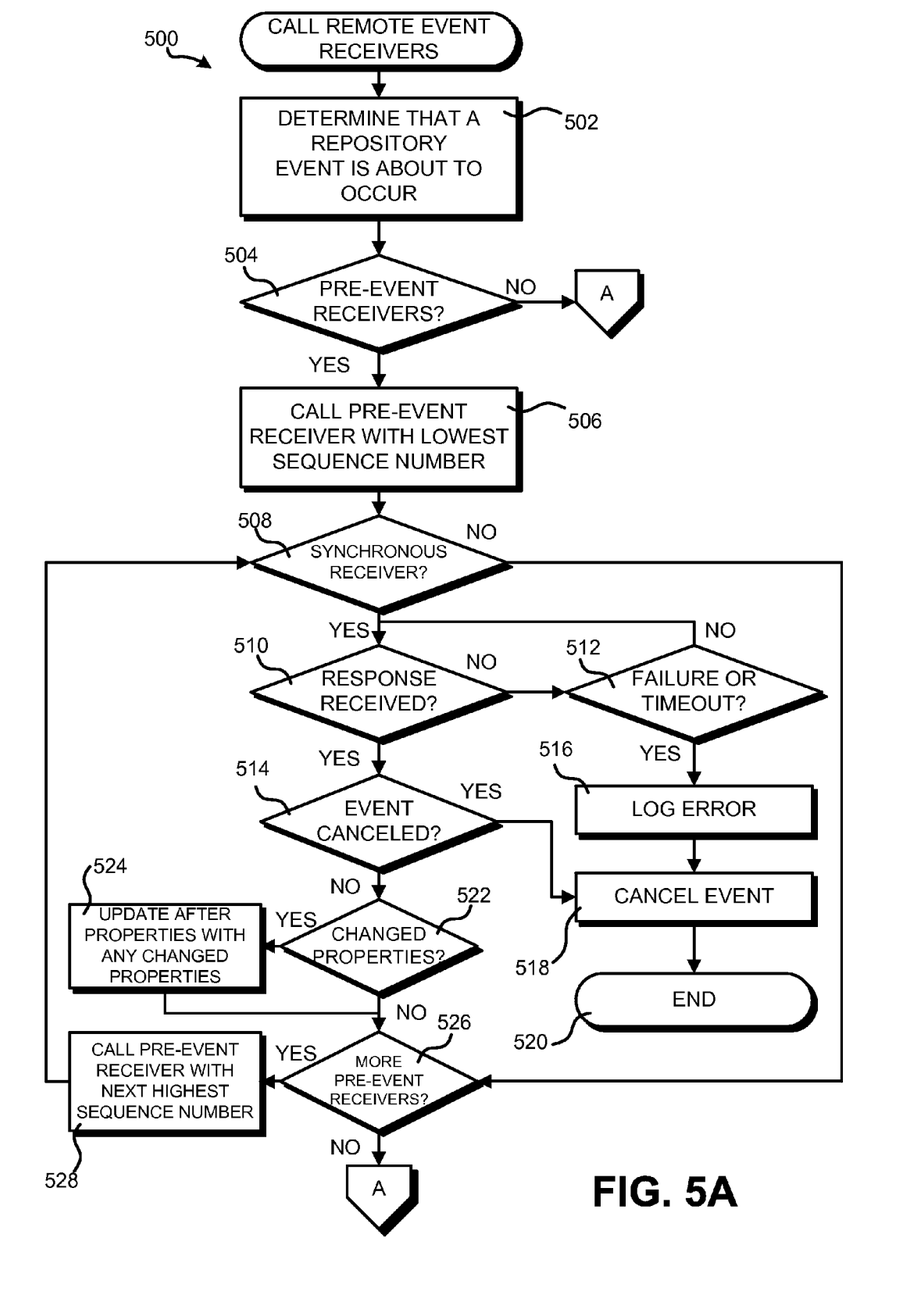
FIGS. 5A-5B are flow diagrams showing aspects of one routine disclosed herein for providing notification of repository events to one or more remote event receivers, according to one embodiment disclosed herein.
Figure 5B:
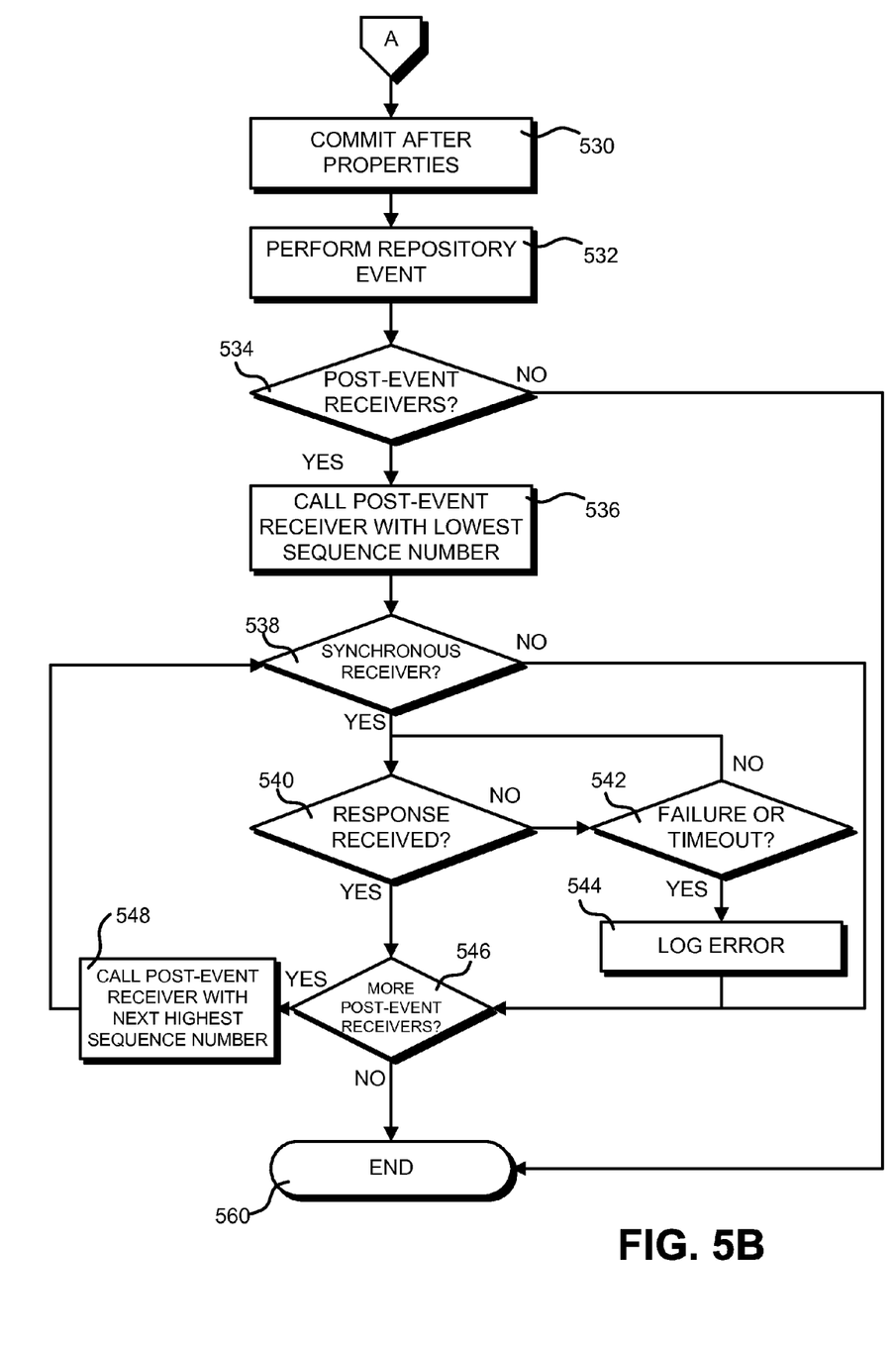

FIGS. 5A and 5B are flow diagrams showing aspects of one routine 500 disclosed herein for providing notification of repository events to one or more remote event receivers 106, according to one embodiment disclosed herein. It should be appreciated that the logical operations described herein with respect to FIGS. 5A and 5B and the other FIGURES are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 500 begins at operation 502, where the document repository application 104 determines that a repository event is about to occur. For instance, the document repository application 104 may receive a request from a user to add, update, modify, or otherwise interact with a document, item, list, field, Web, site, or other element maintained in a document repository. Prior to performing the requested action, the document repository application 104 performs the operations 504-530, which are described in greater detail below.

From operation 502, the routine 500 proceeds to operation 504 where the document repository application 104 determines whether any pre-event remote event receivers 106 have been registered. If not, the routine 500 proceeds from operation 504 to operation 530, described below. If, however, one or more pre-event remote event receivers 106 have been registered, the routine 500 proceeds from operation 504 to operation 506.

At operation 506, the document repository application 104 instructs the remote event receiver caller 112 to call the pre-event receiver 106 having the lowest sequence number. In response to receiving such a request, the routine 500 proceeds to operation 508 where the remote event receiver caller 112 determines whether the remote event receiver 106 to be called is a synchronous remote event receiver 106. As described above, the synchronization type element 204C of the remote event receiver registration XML 202 may be utilized to specify that a remote event receiver 106 is to receive notifications synchronously.

If the remote event receiver 106 to be called is not a synchronous remote event receiver 106, the routine 500 proceeds from operation 508 to operation 526, described below. If the remote event receiver 106 to be called is a synchronous remote event receiver 106, the routine 500 proceeds from operation 508 to operation 510.

At operation 510, the remote event receiver caller 110 determines whether a Web service response 120 has been received from the remote event receiver 106 in response to the Web service call 116. If no response 120 has been received, the routine 500 proceeds to operation 512 where the remote event receiver caller 122 determines whether the Web service call 116 has failed or has timed out. In this regard, the remote event receiver caller 112 may be programmed to time out after a certain period of time has elapsed since the Web service call 116 was made without receiving a response 120.

If the Web service call 116 has not failed or timed out, the routine 500 proceeds back to operation 510. If, however, the Web service call 116 has failed or timed out, the routine 500 proceeds from operation 512 to operation 516. At operation 516 the error is logged so that an administrator of the document repository computing system 102 or the third party computing system 108 can determine why the remote event receiver 106 could not be called. As discussed below, failed or timed out calls may be retried or stored in a durable queue for later processing.

From operation 516, the routine 500 proceeds to operation 518 where the event that was the subject of the Web service call 116 is canceled. In other embodiments, the event may be permitted to proceed even though a Web service call 116 to the remote event receiver could not be completed. From operation 518, the routine 500 proceeds to operation 520, where it ends.

If, at operation 510 the remote event receiver caller 112 determines that a Web service response was received from the remote event receiver 106, the routine 500 proceeds from operation 510 to operation 514. At operation 514, the remote event receiver caller 112 examines the remote event result 122 to determine whether the remote event receiver 106 specified in the status element 402D that the event should be canceled. If so, the routine 500 proceeds from operation 514 to operation 518 where the event that was the subject of the Web service call 116 is canceled. If the remote event receiver 106 did not indicate that the event should be canceled, the routine 500 proceeds from operation 514 to operation 522.

At operation 522 the remote event receiver caller 112 determines whether the remote event receiver 106 provided changed properties 402A in the remote event result 122. If so, the routine 500 proceeds from operation 522 to operation 524 where the after properties 320B for the event are updated with the changed property values specified by the changed properties 402A. The routine 500 then proceeds from operation 524 to operation 526.

At operation 526, the remote event receiver caller 112 determines if additional pre-event receivers 106 remain to be called. If so, the routine 500 proceeds from operation 526 to operation 528 where the remote event receiver caller 112 calls the next remote event receiver 106 having the next highest sequence number. From operation 528, the routine 500 proceeds back to operation 508 where the operations described above are repeated for the next pre-event receiver 106. If no additional pre-event receivers 106 remain to be called, the routine 500 proceeds from operation 526 to operation 530.

At operation 530, the document repository application 104 commits the after properties 320B from the event to the document repository, including any changed properties 402A specified by the remote event receiver 106. The routine 500 then proceeds to operation 532 where the document repository application 104 performs the repository event 532. For instance in the example described above, if a user has requested to add, update, or delete an item or list, the document repository application 104 performs the requested action. From operation 532 the routine 500 proceeds to operation 534.

At operation 534, the document repository application 104 determines whether any post-event receivers 106 have registered for notifications of the event. If not, the routine 500 proceeds from operation 534 to operation 560, where it ends. If post-event receivers 106 have been registered, the routine 500 proceeds from operation 534 to operation 536.

At operation 536, the document repository application 104 instructs the remote event receiver caller 112 to call the post-event remote event receiver 106 having the lowest sequence number. In response to such a request, the remote event receiver caller 112 calls the post-event receiver. The routine 500 then proceeds to operation 538.

At operation 538, the remote event receiver caller 112 determines whether the called remote event receiver 106 is a synchronous post-event remote event receiver 106. If not, the routine 500 proceeds from operation 538 to operation 546 described below. If the called remote event receiver 106 is a synchronous receiver, the routine 500 proceeds from operation 538 to operation 540.

At operation 540, the remote event receiver caller 112 determines whether a Web service response 120 has been received from called receiver 106 in response to the Web service call 116. If not, the routine 500 proceeds from operation 540 to operation 542 where the remote event receiver caller 112 determines whether the Web service call has failed or timed out. If the Web service call 116 has not failed or timed out, the routine 500 proceeds back to operation 540.

If the Web service call 116 has timed out, the routine 500 proceeds to operation 544 where the error is logged. The routine 500 then proceeds to operation 546. It should be appreciated that because the event has already occurred, the failure of a Web service call 116 to a post-event remote event receiver 106 will not cause an event to be canceled. It should also be appreciated that since the event has already been completed, a post-event remote event receiver cannot modify the after properties 320B of an event.

If the remote event receiver caller 112 determines at operation 540 that a response 120 has been received from the called remote event receiver 106, the routine 500 proceeds from operation 540 to operation 546. At operation 546 the document repository application 104 determines whether more post-event receivers 106 remain to be called. If so, the routine 500 proceeds to operation 548 where the remote event receiver caller 112 calls the next post-event receiver having the next highest sequence number. The routine 500 then proceeds from operation 548 to operation 538, described above. If no additional post-event receivers 106 remain to be called, the routine 500 proceeds from operation 546 to operation 560, where it ends.

Figure 6:
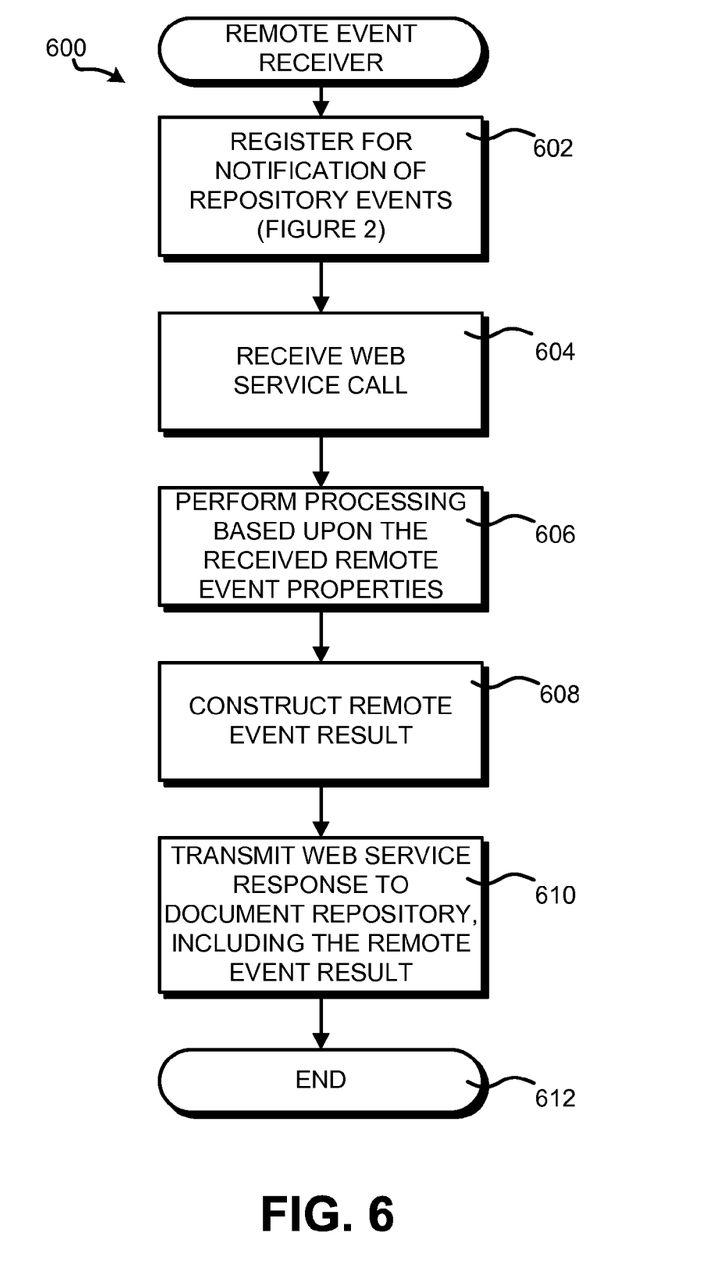
FIG. 6 is a flow diagram showing aspects of one routine for registering a remote event receiver and for processing a notification of a repository event at a remote event receiver according to one embodiment disclosed herein.

FIG. 6 is a flow diagram showing aspects of one routine 600 for registering a remote event receiver 106 and for processing a notification of a repository event at a remote event receiver 106 according to one embodiment disclosed herein. The routine 600 begins at operation 602, where the remote event receiver 106 registers for notification of repository events. The registration may be performed in the manner described above with regard to FIGS. 1 and 2. Once a remote event receiver 106 has registered for notifications of repository events, the remote event receiver 106 is eligible to receive such notifications.

At operation 604, the remote event receiver 106 receives a Web service call 116. The Web service call 116 is generated by the document repository application 104 in response to detecting an event of the type that the remote event receiver 106 has registered for. As discussed above, the Web service call 116 includes remote event properties 118, as described above with regard to FIG. 3.

In response to receiving the Web service call 116, the routine 600 proceeds from operation 604 to operation 606, where the remote event receiver 106 performs processing based upon of the received remote event properties 118. The processing may be performed by the remote event receiver 106 itself. Alternatively, or in combination, processing may also be performed by other processing modules 124 executing on the third-party computing system 108. The routine 600 then proceeds from operation 606 to operation 608.

At operation 608, the remote event receiver 106 constructs the remote event result 122. As described above, the remote event result 122 provides data indicating whether the event should be permitted to continue or be canceled. The remote event result 122 might also include changed properties 402A that should be applied to the after properties 320B associated with the event. Once the remote event result 122 has been constructed at operation 608, the routine 600 proceeds from operation 608 to operation 610.

At operation 610, the remote event receiver 106 transmits the Web service response 120, including the remote event result 122 to the document repository computing system 102. The Web service response 120 is received by the remote event receiver caller 112 or the document repository application 104 and processed in the manner described above. From operation 610, the routine 600 proceeds to operation 612, where it ends.

It should be appreciated that, in one embodiment, the remote event receiver caller 112 is also configured to provide an authentication token (not shown) with the Web service call 116 to remote event receiver 106. The remote event receiver 106 can utilize the authentication token to perform a callback operation to the document repository application 104. Through the callback operation the remote event receiver 106 can obtain additional information regarding the event from the document repository application 104. It should be appreciated that the authentication token might also be provided to the remote event receiver 106 in other ways and at other times, such as when the remote event receiver 106 is registered with a document repository application 104.

It should also be appreciated that, in the embodiments described above, the remote event receiver caller 112 is configured not to re-try Web service calls 116 to an unresponsive remote event receiver 106. In other embodiments, however, the remote event receiver caller 112 may be configured to re-try a Web service call 116 to an unresponsive receiver 106.

Figure 7:
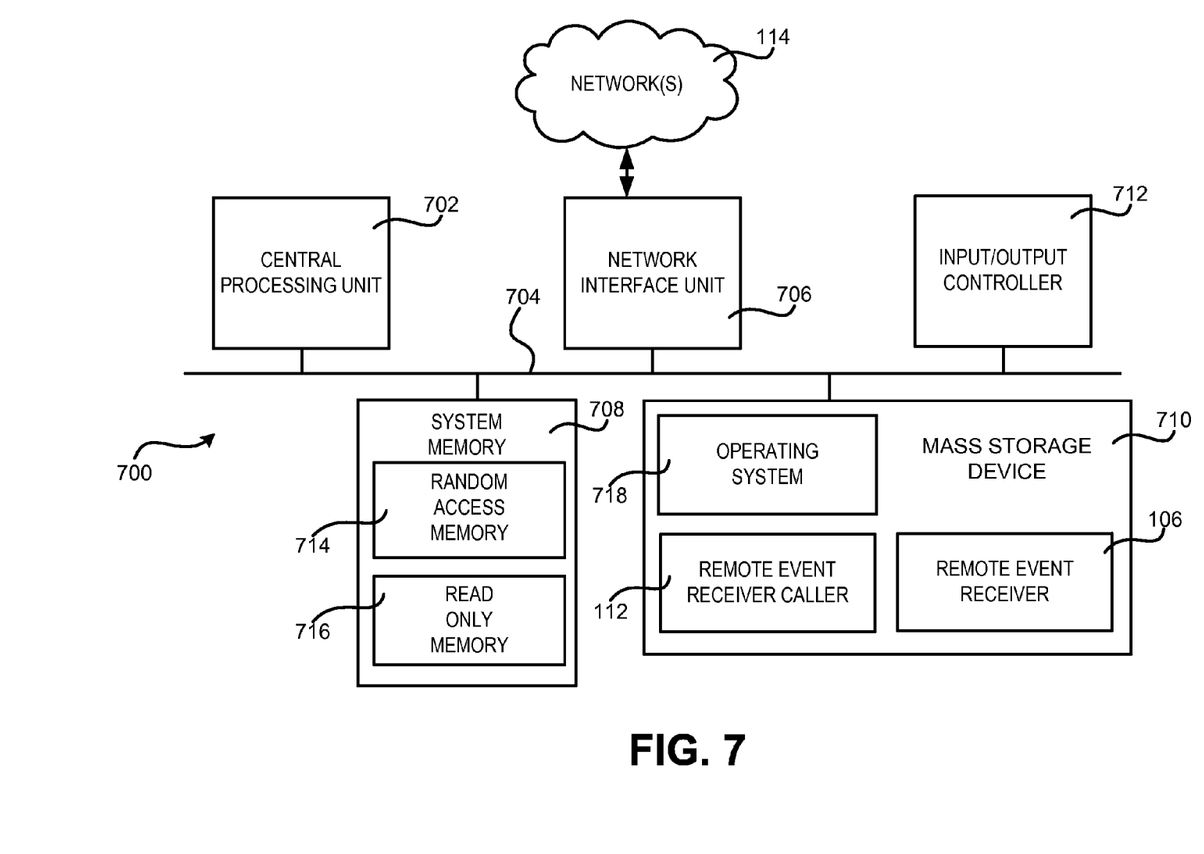
FIG. 7 is a computer architecture diagram showing an illustrative computer hardware and software architecture for a computing system capable of implementing the various embodiments presented herein.

FIG. 7 is a computer architecture diagram showing an illustrative computer hardware and software architecture for a computing system capable of implementing the various embodiments presented herein. The computer architecture shown in FIG. 7 illustrates a conventional desktop, laptop computer, or server computer and may be utilized to execute the various software components described above for providing the functionality disclosed herein.

The computer architecture shown in FIG. 7 includes a central processing unit 702 ("CPU"), a system memory 708, including a random access memory 714 ("RAM") and a read-only memory ("ROM") 716, and a system bus 704 that couples the memory to the CPU 702. A basic input/output system ("BIOS") (not shown) containing the basic routines that help to transfer information between elements within the computer 700, such as during startup, is stored in the ROM 716. The computer 700 further includes a mass storage device 710 for storing an operating system 718, application programs, and other program modules, which will be described in greater detail below.

The mass storage device 710 is connected to the CPU 702 through a mass storage controller (not shown) connected to the bus 704. The mass storage device 710 and its associated computer-readable storage media provide non-volatile storage for the computer 700. Although the description of computer-readable media contained herein refers to a mass storage device, such as a hard disk or CD-ROM drive, it should be appreciated by those skilled in the art that computer-readable storage media can be any available computer storage media that can be accessed by the computer 700.

By way of example, and not limitation, computer-readable storage media may include volatile and non-volatile, removable and non-removable media implemented in any method or technology for storage of information such as computer-readable instructions, data structures, program modules or other data. For example, computer-readable storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other non-transitory medium which can be used to store the desired information and which can be accessed by the computer 700.

It should be appreciated that the computer-readable media disclosed herein also encompasses communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media. Computer-readable storage media does not encompass communication media.

According to various embodiments, the computer 700 may operate in a networked environment using logical connections to remote computers through a network such as the network 114. The computer 700 may connect to the network 114 through a network interface unit 706 connected to the bus 704. It should be appreciated that the network interface unit 706 may also be utilized to connect to other types of networks and remote computer systems. The computer 700 may also include an input/output controller 712 for receiving and processing input from a number of other devices, including a keyboard, mouse, or electronic stylus (not shown in FIG. 7). Similarly, an input/output controller may provide output to a display screen, a printer, or other type of output device (also not shown in FIG. 7).

As mentioned briefly above, a number of program modules and data files may be stored in the mass storage device 710 and RAM 714 of the computer 700, including an operating system 704 suitable for controlling the operation of a networked desktop, laptop, or server computer. The mass storage device 710 and RAM 714 may also store one or more program modules. In particular, the mass storage device 710 and the RAM 714 may store one or more software components for providing the functionality described above, such as the remote event receiver caller 112, the remote event receiver 106, or another type of program or service. The mass storage device 710 and RAM 714 may also store other program modules and data.

In general, software applications or modules may, when loaded into the CPU 702 and executed, transform the CPU 702 and the overall computer 700 from a general-purpose computing system into a special-purpose computing system customized to perform the functionality presented herein. The CPU 702 may be constructed from any number of transistors or other discrete circuit elements, which may individually or collectively assume any number of states. More specifically, the CPU 702 may operate as one or more finite-state machines, in response to executable instructions contained within the software or modules. These computer-executable instructions may transform the CPU 702 by specifying how the CPU 702 transitions between states, thereby physically transforming the transistors or other discrete hardware elements constituting the CPU 702.

Encoding the software or modules onto a mass storage device may also transform the physical structure of the mass storage device or associated computer readable storage media. The specific transformation of physical structure may depend on various factors, in different implementations of this description. Examples of such factors may include, but are not limited to: the technology used to implement the computer readable storage media, whether the computer readable storage media are characterized as primary or secondary storage, and the like. For example, if the computer readable storage media is implemented as semiconductor-based memory, the software or modules may transform the physical state of the semiconductor memory, when the software is encoded therein. For example, the software may transform the states of transistors, capacitors, or other discrete circuit elements constituting the semiconductor memory.

As another example, the computer readable storage media may be implemented using magnetic or optical technology. In such implementations, the software or modules may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

Based on the foregoing, it should be appreciated that technologies for providing notification of events occurring within a document repository system to external systems have been disclosed herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for providing a notification of an event occurring within a document repository, the method comprising performing computer-implemented operations for:
   determining, by a computing device, that an event is to occur within a document repository computing system;
   in response to determining that the event is to occur, determining, by the computing device, whether one or more remote event receivers have registered for notification of the event prior to the occurrence of the event;
   in response to determining that one or more remote event receivers have registered for notification of the event prior to the occurrence of the event, generating, by the computing device, web service calls to the remote event receivers that have registered for notification of the event prior to the occurrence of the event, the web service calls providing notification that the event is to occur;
   determining, by the computing device, that the event has occurred;
   in response to determining that the event has occurred, determining, by the computing device, whether one or more remote event receivers have registered for notification of the event following the occurrence of the event; and
   in response to determining that one or more remote event receivers have registered for notification of the event following the occurrence of the event, generating, by the computing device, web services calls to the remote event receivers that have registered for notification of the event following the occurrence of the event, the web services calls providing notification that the event has occurred.

2. The computer-implemented method of claim 1, wherein each of the one or more remote event receivers has an associated sequence number, and wherein the web services calls are made to the remote event receivers in sequence number order.

3. The computer-implemented method of claim 2, wherein each of the one or more remote event receivers is registered with the document repository computing system to receive the notifications synchronously or asynchronously.

4. The computer-implemented method of claim 3, wherein each of the one or more remote event receivers is further registered with the document repository computing system to receive the notifications prior to the occurrence of the event or following the occurrence of the event.

5. The computer-implemented method of claim 4, further comprising:
   for each of the remote event receivers that has registered to receive notifications synchronously and prior to the occurrence of the event, determining, by the computing device, whether a web service response has been received from the remote event receiver in response to a web services call to the remote event receiver prior to generating a notification to a next remote event receiver;
   in response to receiving a web service response from the remote event receiver, determining, by the computing device, whether the web services response indicates that the event should be canceled; and
   in response to determining that the event should be canceled, canceling, by the computing device, the event and not providing notification of the event to any additional remote event receivers.

6. The computer-implemented method of claim 5, further comprising:
   in response to receiving a web service response from the remote event receiver, determining, by the computing device, whether the web services response includes one or more changed properties associated with the event; and
   in response to determining that the web services response includes one or more changed properties associated with the event, updating, by the computing device, properties associated with the event stored at the document repository computing system with the changed properties prior to the occurrence of the event, and generating the notification to the next remote event receiver after the properties have been updated.

7. The computer-implemented method of claim 6, wherein the web service call to the remote event receiver comprises the properties associated with the event stored at the document repository computing system.

8. A computer-readable storage medium having computer-executable instructions stored thereupon which, when executed by a computer, cause the computer to:
   register a pre-event remote event receiver to receive a notification of an event occurring at a document repository computing system prior to the occurrence of the event;
   register a post-event remote event receiver to receive a notification of the event occurring at the document repository computing system after the occurrence of the event;
   determine that the event is to occur;
   in response to determining that the event is to occur, generate a web service call to the pre-event remote event receiver to provide notification that the event is to occur;
   determine that the event has occurred; and
   in response to determining that the event has occurred, generate a web service calls to the post-event remote event receiver to provide notification that the event has occurred.

9. The computer-readable storage medium of claim 8, wherein the web service calls comprise before properties and after properties associated with the event.

10. The computer-readable storage medium of claim 9, wherein the pre-event remote event receiver comprises a synchronous pre-event remote event receiver.

11. The computer-readable storage medium of claim 10, having further computer-executable instructions stored thereupon which, when executed by the computer, cause the computer to:
   determine whether a web service response has been received in response to the web service call made to the synchronous pre-event remote event receiver;
   in response to determining that a web service response has been received from the synchronous pre-event remote event receiver, determining whether the web service response indicates that the event should be canceled; and
   in response to determining that the event should be canceled, canceling the event and not generating the web service call to the post-event remote event receiver.

12. The computer-readable storage medium of claim 11, having further computer-executable instructions stored thereupon which, when executed by the computer, cause the computer to:
   in response to determining that a web service response has been received from the synchronous pre-event remote event receiver, determining whether the web service response identifies one or more changed properties; and
   in response to determining that the web services response includes one or more changed properties, updating the after properties prior to generating the web services call to the post-event remote event receiver.

13. The computer-readable storage medium of claim 12, wherein each remote event receiver has a sequence number associated therewith, and wherein notifications of the event are provided to the remote event receivers in sequence number order.

14. The computer-readable storage medium of claim 13, wherein a network address of each of the remote event receivers is provided during registration of the remote event receivers.

15. The computer-readable storage medium of claim 14, wherein the remote event receivers are registered declaratively or using an object model provided by the document repository computing system.

16. A document repository computing system configured to provide a notification of an event occurring within the document repository computing system, comprising:
one or more computer systems configured to execute a remote event receiver caller, the remote event receiver caller configured to provide a notification of an event occurring at the document repository computing system to one or more registered synchronous or asynchronous remote event receivers, the remote event receivers executing on computer systems external to the document repository computing system.

17. The system of claim 16, wherein the remote event receivers comprise pre-event remote event receivers and post-event receivers.

18. The system of claim 17, wherein the notification comprises a web services call to a network address provided during registration of the remote event receivers.

19. The system of claim 18, wherein the remote event receiver caller is configured to wait for a response from synchronous remote event receivers prior to providing notifications to other remote event receivers.

20. The system of claim 19, wherein the synchronous remote event receivers are configured to provide a web services response in response to a notification, the web services response indicating that the event should be cancelled or providing changed properties associated with the event.

* * * * *